US009824294B2

(12) United States Patent
Ruan et al.

(10) Patent No.: US 9,824,294 B2
(45) Date of Patent: Nov. 21, 2017

(54) SALIENCY INFORMATION ACQUISITION DEVICE AND SALIENCY INFORMATION ACQUISITION METHOD (71) Applicant: OMRON Corporation, Kyoto (JP)

(72) Inventors: Xiang Ruan, Shiga (JP); Huchuan Lu, Dalian (CN)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 15/083,018

(22) Filed: Mar. 28, 2016

(65) Prior Publication Data

US 2016/0358035 A1  Dec. 8, 2016

(30) Foreign Application Priority Data

Jun. 4, 2015  (CN) .......................... 2015 1 0303277

(51) Int. Cl.
*G06K 9/62* (2006.01)
*G06K 9/46* (2006.01)
(Continued)

(52) U.S. Cl.
CPC ......... *G06K 9/4676* (2013.01); *G06K 9/4628* (2013.01); *G06K 9/627* (2013.01);
(Continued)

(58) Field of Classification Search
USPC ....................................................... 382/156
See application file for complete search history.

(56) References Cited

U.S. PATENT DOCUMENTS

2004/0042662 A1* 3/2004 Wilensky ............... G06K 9/342
382/194
2008/0025562 A1* 1/2008 Takemoto ............... G06T 5/009
382/100
(Continued)

FOREIGN PATENT DOCUMENTS

KR  2012-0127247 A  11/2012

OTHER PUBLICATIONS

Extended European Search Report in counterpart European Application No. 16 160 433.5 dated Oct. 13, 2016 (5 pages).
(Continued)

*Primary Examiner* — Jerome Grant, II
(74) *Attorney, Agent, or Firm* — Osha Liang LLP (57) ABSTRACT

A saliency information acquisition device has a local saliency acquisition unit configured to calculate a saliency measure for each pixel in an input image on the basis of information obtained from a local region surrounding each pixel, a candidate-region setting unit configured to set a plurality of candidate regions in the input image, a global saliency acquisition unit configured to calculate a saliency measure for each candidate region in the plurality of candidate regions on the basis of information including a local saliency feature representing an attribute of the saliency measure for each pixel within a candidate region, and a global feature representing an attribute of the candidate regions in relation to the entire input image, and an integration unit configured to combine the saliency measure for each candidate region in the plurality of candidate regions obtained by the global saliency acquisition unit to generate saliency information.

14 Claims, 8 Drawing Sheets

(51) Int. Cl.
*G06N 3/04* (2006.01)
*G06K 9/66* (2006.01)

(52) U.S. Cl.
CPC .............. *G06K 9/6277* (2013.01); *G06K 9/66* (2013.01); *G06N 3/0454* (2013.01)

(56) References Cited

U.S. PATENT DOCUMENTS

| | | | | |
|---|---|---|---|---|
| 2008/0285856 | A1* | 11/2008 | Zahavi | G06K 9/50 382/195 |
| 2009/0322933 | A1* | 12/2009 | Ishii | G02B 7/102 348/345 |
| 2010/0014758 | A1* | 1/2010 | Yano | G06K 9/00228 382/195 |
| 2011/0243455 | A1* | 10/2011 | Miyajima | G01C 21/3602 382/201 |
| 2011/0262039 | A1* | 10/2011 | Du | G06K 9/00228 382/167 |
| 2015/0072371 | A1* | 3/2015 | Marugame | G01N 33/4833 435/29 |
| 2016/0163035 | A1* | 6/2016 | Chang | G06K 9/4628 382/149 |
| 2016/0203367 | A1* | 7/2016 | Oami | G06K 9/00711 382/103 |
| 2016/0314380 | A1* | 10/2016 | Abdulkader | G06K 9/66 |
| 2016/0350930 | A1* | 12/2016 | Lin | H04N 13/0203 |

OTHER PUBLICATIONS

L. Wang et al; "Deep Networks for Saliency Detection via Local Estimation and Global Search"; 2015 IEEE Conference on Computer Vision and Pattern Recognition (CVPR), pp. 3183-3192; May 24, 2015 (5 pages).

Office Action in counterpart Korean Patent Application No. 10-2016-003218 dated Dec. 2, 2016 (11 pages).

A. Borji et al; "Exploiting Local and Global Patch Rarities for Saliency Detection"; 2012 IEEE Conference on Computer Vision and Pattern Recognition (CVPR), pp. 478-485; Jun. 16, 2012 (8 pages).

D. Erhan et al; "Scalable Object Detection using Deep Neural Networks"; 2014 IEEE Conference on Computer Vision and Pattern Recognition (CVPR), pp. 1-8; Jun. 23, 2014 (8 pages).

P. Krähenbühl et al; "Geodesic Object Proposals"; European Conference on Computer Vision (ECCV), pp. 725-739; Sep. 6, 2014 (15 pages).

Itti, L., et al.; "A Model of Saliency-Based Visual Attention for Rapid Scene Analysis"; IEEE Transactions on Pattern Analysis and Machine Intelligence; vol. 20, No. 11; pp. 1254-1259; Nov. 1998 (6 pages).

Cheng, M. M., et al.; "Global Contrast based Salient Region Detection"; CVPR, pp. 409-416; 2011 (8 pages), Dec. 2011.

Krähenbühl, P., et al.; "Geodesic Object Proposals"; ECCV; pp. 725-739; 2014 (15 pages), Dec. 2014.

Krizhevsky, A., et al.; "ImageNet Classification with Deep Convolutional Neural Networks"; NIPS; pp. 1097-1105; 2012 (9 pages), Dec. 2012.

* cited by examiner

Four end regions​​​​​​​​​​​​​​​​ Candidate Region (i)

FIG. 8

SALIENCY INFORMATION ACQUISITION DEVICE AND SALIENCY INFORMATION ACQUISITION METHOD

BACKGROUND

Technical Field

The present invention relates to techniques for automatically detecting a salient region in an image.

Related Art

Techniques are known for using image analysis to automatically detect an important region in an image, or a region likely to draw a person's focus (such regions are referred to as saliency regions below). These kinds of techniques are referred to as saliency detection or visual attention detection and have been increasingly gaining attention as an important technological feature in computer vision.

An algorithm for saliency detection can usually be classified roughly into a local technique and a global technique. A local technique calculates a saliency measure using the features (e.g. local contrast, edge orientation, and the like) extracted from a local region within the image as a clue (e.g., L. Itti, et. al., "A model of saliency-based visual attention for rapid scene analysis", PAMI, 20(11):1254-1259, 1998; Non-Patent Document 1). On the other hand a global technique calculates a saliency measure using the features (e.g., global contrast, histograms) or prior knowledge (e.g., the background, or an easy to focus location) as clues (e.g., M. M. Cheng, et. al., "Global contrast based salient region detection", In CVPR, pages 409-416, 2011; Non-Patent Document 2).

Many of these kinds of saliency detection algorithms have been proposed thus far. However, it tends to be difficult to obtain highly accurate detection results from a variety of images, and further improvement in the versatility and reliability of saliency detection is desired.

Non-Patent Document 1: L. Itti, C. Koch, and E. Niebur. A model of saliency-based visual attention for rapid scene analysis. PAMI, 20(11):1254-1259, 1998.
Non-Patent Document 2: M. M. Cheng, G. X. Zhang, N. J. Mitra, X. Huang, and S. M. Hu. Global contrast based salient region detection. In CVPR, pages 409-416, 2011.
Non-Patent Document 3: P. Krahenbuhl and V. Koltun. Geodesic object proposals. In ECCV, pages 725-739. 2014.
Non-Patent Document 4: A. Krizhevsky, I. Sutskever, and G. E. Hinton. Imagenet classification with deep convolutional neural networks. In NIPS, pages 1097-1105, 2012.

SUMMARY

A saliency detection technique according to one or more embodiments of the present invention has superior versatility and reliability.

Specifically, a saliency information acquisition device according to one or more embodiments of the invention includes a local saliency acquisition unit configured to calculate a saliency measure for each pixel in an input image on the basis of information obtained from a local region surrounding each pixel; a candidate-region setting unit configured to set a plurality of candidate regions in the input image; a global saliency acquisition unit configured to calculate a saliency measure for each candidate region in the plurality of candidate regions on the basis of information including a local saliency feature representing an attribute of the saliency measure for each pixel within a candidate region, and a global feature representing an attribute of the candidate regions in relation to the entire input image; and an integration unit configured to combine the saliency measure for each candidate region in the plurality of candidate regions obtained by the global saliency acquisition unit to generate saliency information for the input image.

With the above configuration, a saliency measure is calculated per pixel using information obtained from a local region as a clue (i.e., a local saliency), where after a saliency measure is calculated for each candidate region with the local saliency feature and the global feature for each region as a clue (i.e., global saliency), where local saliency and global saliency are combined to finally generate saliency information. Accordingly, saliency can be evaluated in a way that takes into account both localized attributes and attributes embodying the whole image, thereby improving the versatility and the reliability of saliency detection.

The local saliency acquisition unit may use a first deep neural network to calculate a saliency measure for each pixel in the input image. Existing saliency detection algorithms require the user to plan the features or combination of features used in evaluating the saliency measure. Therefore, it tended to be extremely difficult to optimize the features used and the performance of the saliency detection algorithm depended disadvantageously on the quality of the features selected. In contrast, one or more embodiments of the invention uses a first deep neural network, and may be capable of automatically building a classifier that calculates a saliency measure from the information in a local region through machine learning. Consequently, one or more embodiments of the invention may be able to easily build a classifier having stable performance.

The first deep neural network may be a neural network configured to receive an image of a local region surrounding a given pixel as an input, and output a saliency measure for said pixel as an estimation result. While there are various features that may be extracted from a local region, it is not clear which of the features influences saliency. Therefore, inputting the image itself, which is raw data, into the first deep neural network and optimizing feature extraction, selection, and combination inside the first deep neural network during the machine learning stage improves the reliability of the estimation result, i.e., the saliency measure.

The saliency information acquisition device may further include a local saliency refinement unit configured to refine the saliency measure for each pixel on the basis of the saliency measure for each pixel obtained by the local saliency acquisition unit and the plurality of candidate regions obtained by the candidate-region setting unit so that the saliency measure for a pixel included in the candidate region becomes relatively larger and the saliency measure for a pixel outside of the candidate region becomes relatively smaller; and the global saliency acquisition unit uses the saliency measure refined by the local saliency refinement unit to obtain the local saliency feature for each of the candidate regions. Using spatial information such as inside or outside the candidate region as a supplement when refining the saliency measure thereby reduces the noise in a saliency distribution, and increases the spatial uniformity of the saliency distribution.

The global saliency acquisition unit may use a second deep neural network to calculate a saliency measure for each candidate region in the plurality of candidate regions. Existing saliency detection algorithms require the user to plan the features or combination of features used in evaluating the saliency measure. Therefore, it tended to be extremely difficult to optimize the features used and the performance of the saliency detection algorithm depended disadvantageously on the quality of the features selected. In contrast, one or more embodiments of the invention may use a second deep neural network and thereby may be capable of automatically building classifier that calculates a saliency measure for each candidate region from information including local saliency features and global features through machine learning. Consequently, one or more embodiments of the invention may be able to easily build a classifier having stable performance.

The second deep neural network may be a neural network configured to receive as input a feature vector containing the local saliency feature and the global feature of a given candidate region as components, and output a saliency measure of said candidate region as an estimation result. While there may be various local saliency features and global features, it is not clear which of these features influences saliency. Therefore, inputting various kinds of local saliency features and global features into the second deep neural network and optimizing feature extraction, selection, and the combination inside the second deep neural network during the machine learning stage improves the reliability of the estimation result, i.e., the saliency measure.

The local saliency feature may conceivably be, for example: a statistic of the saliency measure for each pixel within the candidate region; the ratio of the total of the saliency measure for each pixel in a candidate region to the total of the saliency measure for each pixel in the entire input image; a product of the aforementioned statistic and the aforementioned ratio; and an overlap ratio of the aforementioned candidate region to the regions in the input image where the saliency measure is nonzero. And, one or more of these may be used as a local saliency feature.

The global feature may conceivably be, for example: a difference between a color histogram for the candidate region and the color histogram of an end region in the input image; a difference between a representative color value within the candidate region and a representative color value within the end region in the input image; a difference between a color histogram of the candidate region and a color histogram of the entire input image; and the dispersion of the colors within the candidate region. And, one or more of these may be used as a global feature.

The following may also conceivably be used as a global feature: the aspect ratio of a square enclosing the candidate region; the height of said square; the width of said square; the center coordinate of the candidate region; the length along a long axis of the candidate region; the length along the short axis of a candidate region; and an Euler number for the candidate region. These properties represent the geometrical attributes of the candidate region. And, one or more of these may be used as a global feature.

The integration unit may perform a weighted sum of the saliency measures for the plurality of candidate regions using a weight corresponding to the reliability of the estimation result from the second deep neural network for each candidate region to generate saliency information for the input image. Hereby, more reliable saliency information may be obtained.

The candidate-region setting unit may detect a plurality of objectness regions from within the input image, and set the plurality of detected regions as the plurality of candidate regions. A person's attention is often directed at the object captured in an image, more so than the background or an empty region in the image. Accordingly, it is appropriate to think of saliency as evaluating each object existing within an image. It is thus reasonable to expect that setting an object-ness region as a candidate region will further improve the reliability of the saliency information obtained.

Note that a saliency information acquisition device, or saliency detection device, or the like having at least a portion of the above-mentioned features and functions lies within a scope of the invention. A saliency information acquisition method, or saliency detection method, or the like including at least a portion of the above-mentioned processes also lies within a scope of the invention. Moreover, a program for executing these methods on a computer, or a computer readable medium storing such a program down temporarily are also within a scope of the invention. The above-mentioned processes and features may be freely combined with each other insofar as is technically possible, within a scope of the invention.

One or more embodiments of the present invention provides a saliency detection technique with superior versatility and reliability.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. In an algorithm for saliency detection according to one or more embodiments of the present invention, a saliency region is automatically detected its ore extracted from a still image or a video using image analysis on a computer. Saliency information, which is the result of saliency detection, may be output as a saliency map representing a distribution of the saliency measure for each pixel or each region, or as a binary image wherein a saliency map is converted to a binary representation using a predetermined threshold. According to one or more embodiments of the present invention, this kind of saliency information is employed in a variety of ways such as preprocessing in a computer vision application, e.g., partitioning image regions (segmentation), image classification, scene interpretation, image compression, facial recognition, and object recognition.

The saliency detection algorithm according to one or more embodiments of the invention is made up of two stages: local estimation, and global detection. The former local estimation stage estimates a saliency measure for each pixel using information obtained from a local region surrounding each pixel in the input image is a clue, and temporarily generates a saliency map (referred to as a local saliency map). The latter global detection stage estimates a saliency region using the local saliency map obtained during the local estimation stage and information obtained from the entire input image as clues, and generates a final saliency map. Hereby, saliency can be evaluated in a way that takes into account both localized attributes in an image and attributes embodying the whole image, thereby improving the robustness of the algorithm and increasing the versatility thereof while improving the accuracy and reliability of the saliency detection.

Moreover, a deep neural network (DNN) which is a deep learning based network is used in each of the stages of local estimation and global detection in one or more of the embodiments below. The first deep neural network used during the local estimation stage (hereafter, DNN-L) is trained on the relationship between local features (e.g., localized contrast, texture, and shape information) that can be extracted from a local region surrounding a pixel and saliency using multiple images serving as trainers. The second deep neural network used during the global detection stage (hereafter, DNN-G) is trained on the relationship between global features (e.g., global contrast, geometrical information including positional information within the image) that can be extracted from an input image and saliency using multiple images serving as trainers. These techniques allow the modeling of the complicated dependent relationships between the various clues (features) that can be extracted from an image, and the importance thereof (contributions in terms of saliency), as well as the construction of a saliency detection engine that can be flexibly applied to an arbitrary image.

A saliency detection algorithm according to one or more embodiments of the invention is described below with reference to the drawings. However, the embodiments described below are merely examples, and do not limit a scope of the invention.

Device Configuration

Figure 1:
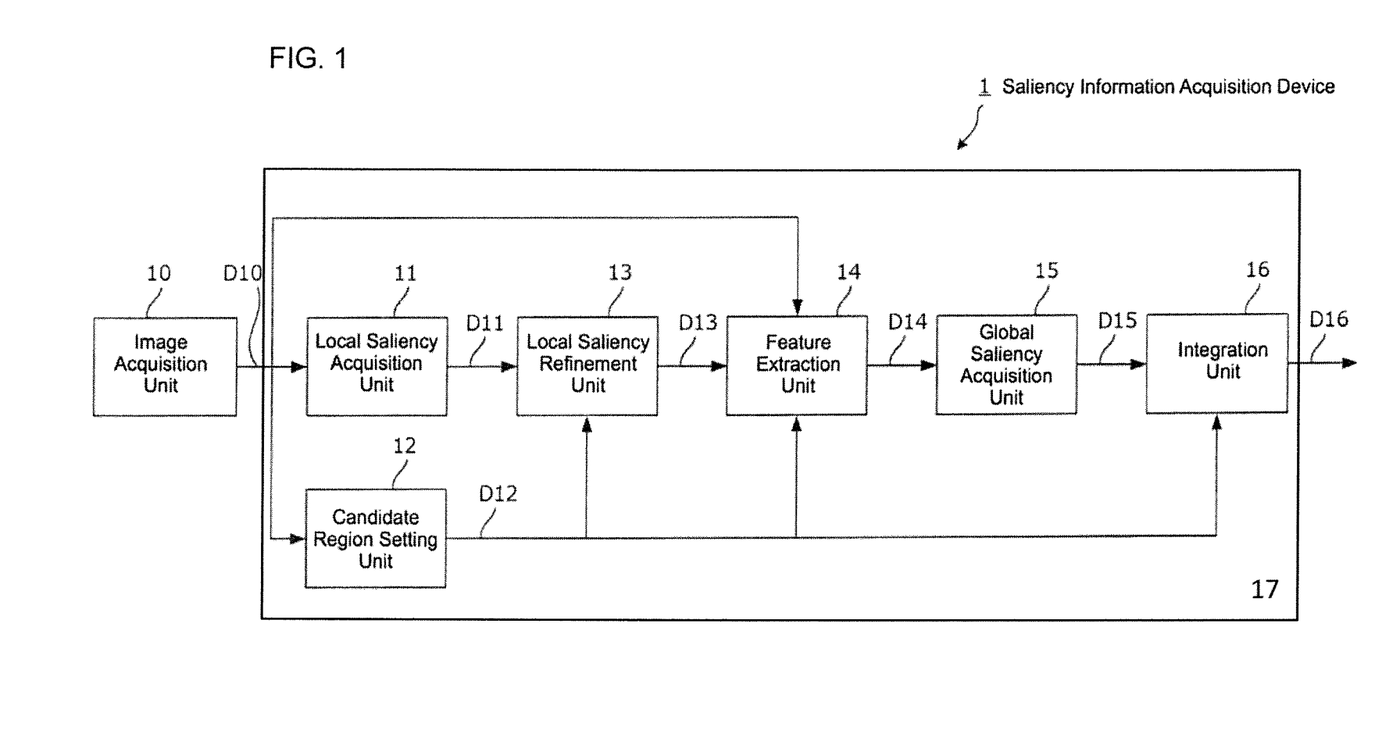
FIG. 1 is a block diagram illustrating a functional configuration of a saliency information acquisition device according to one or more embodiments of the present invention.

FIG. 1 is a block diagram illustrating a functional configuration of a saliency information acquisition device according to one or more embodiments of the present invention. The saliency information acquisition device 1 mainly includes an image acquisition unit 10; a local saliency acquisition unit 11; a candidate-region setting unit 12; a local saliency refinement unit 13; a feature extraction unit 14; a global saliency acquisition unit 15; and an integration unit 16. The local saliency acquisition unit 11, the candidate-region setting unit 12, the local saliency refinement unit 13 are function blocks related to local estimation, while the candidate-region setting unit 12, the feature extraction unit 14, the global saliency acquisition unit 15 and the integration unit 16 are function blocks related to global detection. The reference numerals D10 through D16 represents the data transferred between the function blocks.

The image acquisition unit 10 acquires an image that is to be processed. The image acquisition unit 10 may be acquire image data from an imaging device (camera), or may read image data from a storage device or a server on a network. While no particular image format is required, one or more embodiments of the present invention is described based on an RGB color image. The image input may also be a still image or a video. When a video is input, the later-described saliency detection process is executed frame by frame. The input image D10 acquired may be stored in memory and the like, and used, for example, by the local saliency acquisition unit 11, the candidate-region setting unit 12, and the feature extraction unit 14.

The local saliency acquisition unit 11 includes a feature of computing calculates (estimates) a saliency measure for each pixel in the input image D10 on the basis of information obtained from a local region surrounding the pixel. The local saliency acquisition unit 11 uses a deep neural network DNN-L as a classifier to estimate the saliency measure from the information in the local region. The data representing the distribution of the saliency measures estimated by the local saliency acquisition unit 11 for each pixel is referred to as a local saliency map D11.

The candidate-region setting unit 12 includes a feature of setting a plurality of candidate regions D12 from the input image D10. The local saliency refinement unit 13, the feature extraction unit 14, and the integration unit 16 may use this candidate region D12.

The local saliency refinement unit 13 includes a feature of the saliency measure for each pixel on the basis of the local saliency map D11 obtained by the local saliency acquisition unit 11, and the plurality of candidate regions D12 obtained by the candidate-region setting unit 12. The refined local saliency map D13 is used in the later global detection stage. Note that the refinement process may be omitted when the local saliency map D11 obtained by the local saliency acquisition unit 11 is sufficiently reliable; in that case, the local saliency map D11 is used in the global detection as is.

The feature extraction unit 14 includes a feature of extracting various kinds of features that may serve as clues from the plurality of candidate regions D12 and generates a multidimensional feature vector D14. A feature includes at least an element representing an attribute of the saliency measure for each pixel within a candidate region (referred to as a local saliency feature), and an element representing an attribute of the candidate region in relation to the entire input image D10 (referred to as a global feature).

The global saliency acquisition unit 15 includes a feature of calculating (estimating) a saliency measure for each of the candidate regions on the basis of the feature vector D14 obtained from the feature extraction unit 14. The global saliency acquisition unit 15 uses a deep neural network DNN-G as a classifier to estimate the saliency measure from the feature vector D14. The estimation result D15 from the global saliency acquisition unit 15 is input into the integration unit 16.

The integration unit 16 includes a feature of integrating the saliency measure obtained for the plurality of candidate regions by the global saliency acquisition unit 15, and generates a final saliency map (saliency information) for the entire input image. The final saliency map D16 generated by the integration unit 16 may be storage in a storage unit, or output to an external device to be used by various computer vision applications such as object recognition or image classification.

The saliency information acquisition device 1 may be composed of for instance a computer equipped with a CPU (processor) 17, a memory, and auxiliary storage device, an input device, a display device, and a communication device.

A program stored in the auxiliary storage device may be loaded into memory and run on the CPU to implement each of the functions illustrated in the saliency information acquisition device 1 in FIG. 1. However, all or a portion of the functions of the saliency information acquisition device 1 may be implemented as circuits on an ASIC or an FPGA or the like. Alternatively, a portion of the functions of the saliency information acquisition device 1 may be implemented through cloud computing or distributed computing.

The Saliency Detection Process

Figure 2:
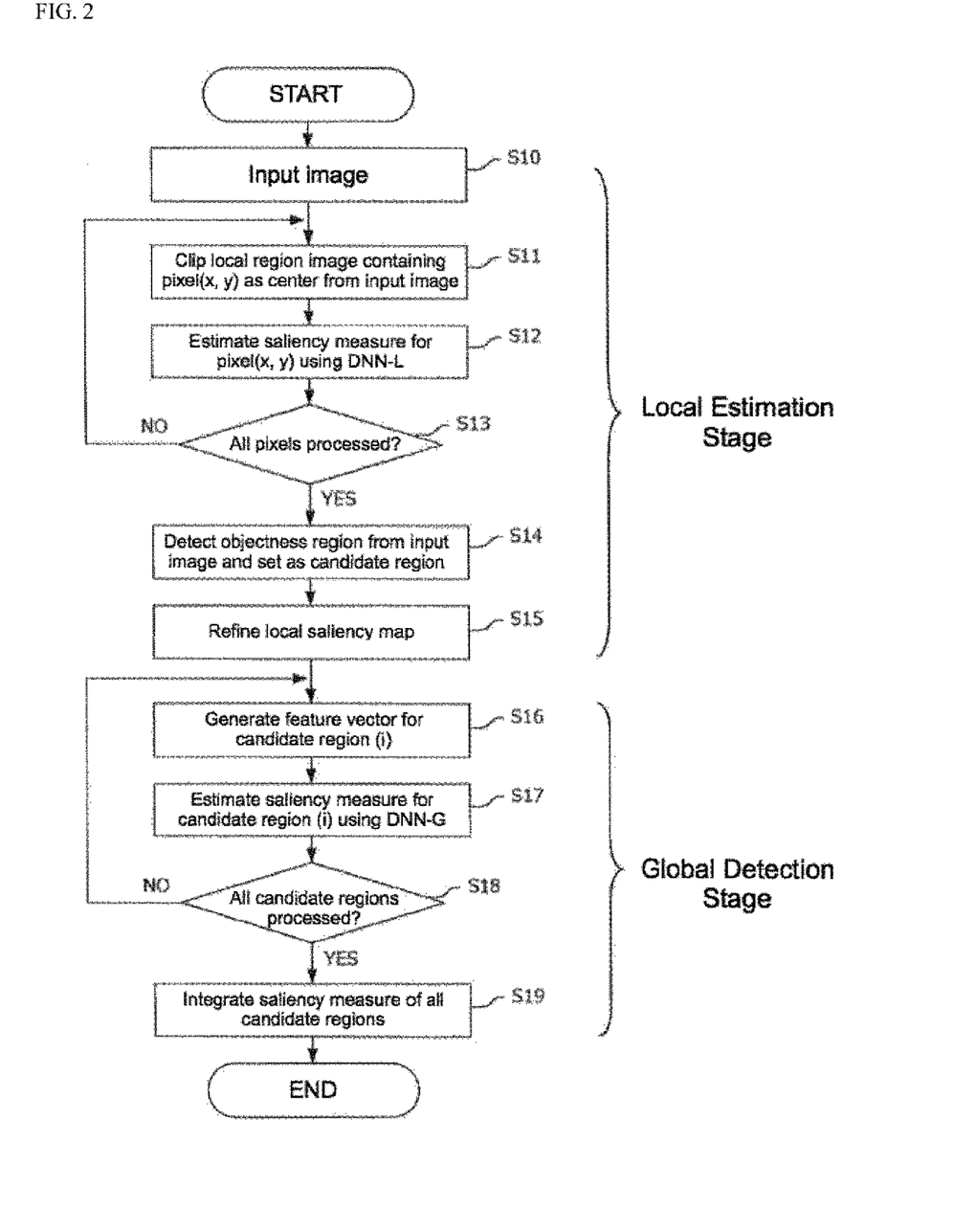
FIG. 2 is a flowchart illustrating the flow of a saliency detection process according to one or more embodiments of the present invention.

The saliency detection process carried out by the saliency information acquisition device 1 is described in detail. FIG. 2 is a flowchart illustrating the flow of the saliency detection process.

(1) Local Estimation Stage

Figure 3:
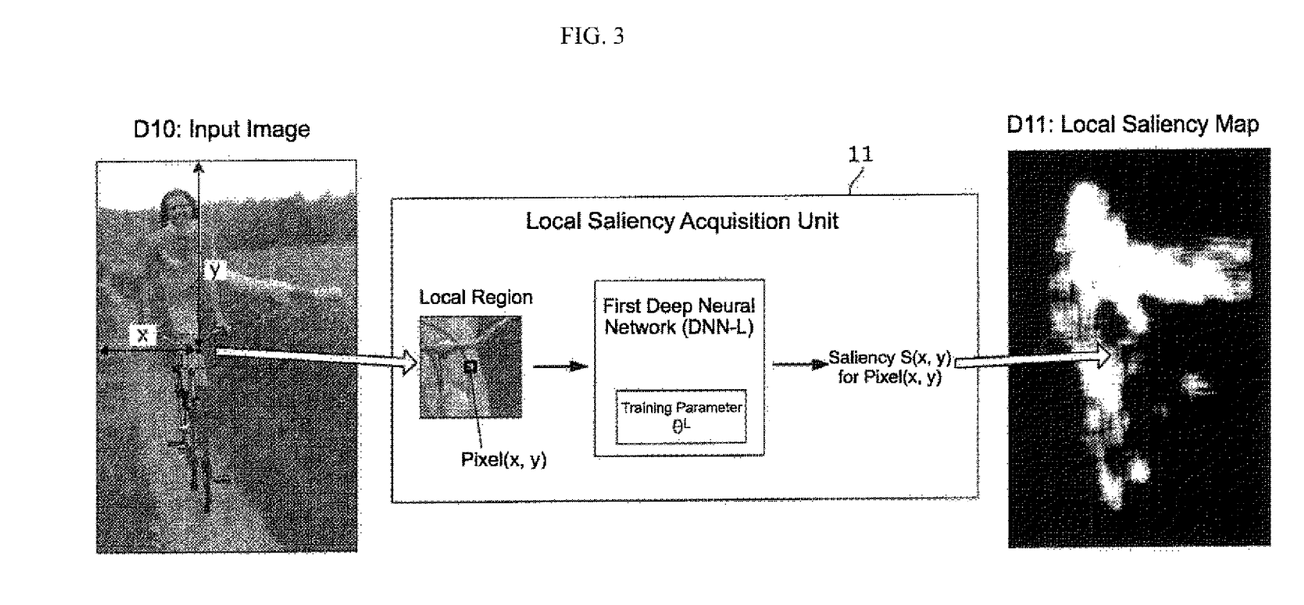
FIG. 3 is a diagram for describing local saliency acquisition according to one or more embodiments of the present invention.

In step S10, the image acquisition unit 10 acquires an input image for saliency detection processing. The image acquisition unit 10 may perform preprocessing such as format conversion, resolution conversion, or noise removal or the like if needed. FIG. 3 depicts an image of a woman riding a bicycle is one example of an input image D10. Conceivably, in many cases, a person viewing this image, will focus on taking a picture of the woman, who is the subject. Therefore, the output result expected from the saliency information acquisition device 1 is a saliency map where the region including the woman has a high saliency measure.

Moving on, the processes in steps S11 through S13 are executed in order for all the pixels within the input image D10. Hereafter, a pixel at a coordinate (x, y) in the input image D10 is represented as pixel(x, y). FIG. 3 is a schematic of the processes in step S11 through S13.

The local saliency acquisition unit 11 clips a local region image of a predetermined size from the input image D10, with the pixel(x, y) in the image being processed as the center thereof (step S11). Although the size of the local region image may be established as desired, in one or more embodiments, the local region image is 51×51 pixels. The local saliency acquisition unit 11 uses DNN-L to calculate a saliency measure for the pixel(x, y) (step S12). The DNN-L is configured to receive an input of a 51×51 pixel local region image and to output the saliency measure for the center thereof, pixel(x, y), as an estimation result. An estimation result S (x, y) is a value from 0 to 1, or is given a value from 0 to 255, where zero represents no saliency and the value increases as the saliency increases. The configuration of DNN-L, and a technique for training the parameter $\theta^L$ are described later.

The local saliency acquisition unit 11 repeats steps S11 and S12 until a saliency measure is obtained for all the pixels within the input image D10 (step S13). A local saliency map D11 as illustrated in FIG. 3 is obtained as a result thereof. The saliency measure for each pixel is represented in gray scale where a lighter (closer to white) the pixel, the higher the saliency.

The candidate-region setting unit 12 sets a plurality of candidate regions D12 from the input image D10. While any desired method may be used for determining a candidate region D12, in one or more embodiments, the candidate-region setting unit 12 detects the plurality of "objectness regions" (regions that have the possibility of being objects) from the input image D10 and sets the respective regions detected as candidate regions D12. A person's attention is often directed at the object captured in an image, more so than the background or an empty region in the image. Accordingly, it is appropriate to think of saliency as evaluating each object existing within an image. Therefore, an objectness region is sent as a candidate region D12 and the following processes executed based on a candidate region. Further improvements in the reliability of the saliency information can be expected since the above makes provides saliency detection that takes into account the likelihood that a region being an object (i.e., objectness).

Various techniques for detecting an objectness region from an image are proposed, and any of these methods may be used; one or more embodiment adopts the Geodesic Object Proposals (GOP) described in P. Krahenbuhl, et. al., 2014 (Non-Patent Document 3).

Figure 4:
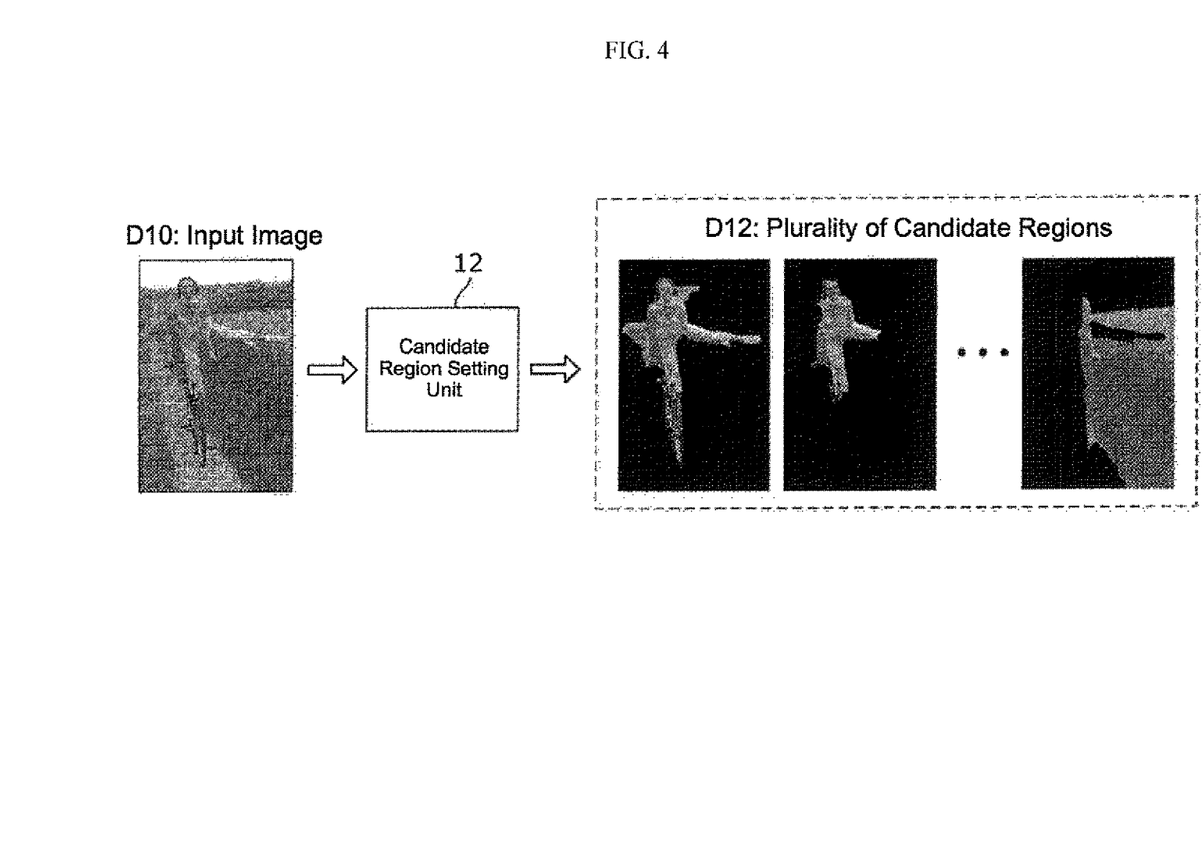
FIG. 4 is a diagram for describing using the GOP method to set a candidate region according to one or more embodiments of the present invention.

FIG. 4 illustrates one example of a candidate region D12 obtained from a GOP. Note performing strict object detection at this point is not required and, according to one or more embodiments of the present invention, the detection does not leave out any region that may be an object. As can be understood from the example presented in FIG. 4 the plurality of candidate regions D12 may include overlapping sections (redundant sections).

Incidentally, because the local saliency map D11 is calculated from only local information, the local saliency map D11 tends to include noise due to the high-frequency components (e.g., outlines within the background, and changes in patterns or colors) contained in the input image D10. Therefore, in step S15 the local saliency refinement unit 13 refines the local saliency map D11 on the basis of information in the plurality of candidate regions D12 obtained in step S14. At this point, the saliency measure for each pixel may be refined so that the saliency measure for the pixels contained in the candidate region D12 is relatively large while the saliency measure for pixels outside the candidate region D12 is relatively small.

A specific example of the refinement process adopted in one or more embodiments is described with reference to FIG. 5. First, the local saliency refinement unit 13 calculates a reliability score $conf^L$ for each candidate region (i) using Expression (1). Note that the superscript "L" is a symbol indicating a relationship to local estimation.

Formula 1

$$conf_i^L = \frac{(1+\beta) \times A_i \times C_i}{\beta \times A_i \times C_i} \quad \text{Expression (1)}$$

$$A_i = \frac{\sum_{x,y} O_i(x, y) \times S^L(x, y)}{\sum_{x,y} O_i(x, y)} \quad \text{Expression (2)}$$

$$C_i = \frac{\sum_{x,y} O_i(x, y) \times S^L(x, y)}{\sum_{x,y} S^L(x, y)} \quad \text{Expression (3)}$$

Here "i" is a candidate region number. When m candidate regions are set, "i" is a value from 1 to m. The parameter $O_i$ is a mask for the candidate region (i); $O_i$ (x, y)=1 implies that the pixel(x, y) is contained in the i-th candidate region, while $O_i$ (x, y)=1 implies that the pixel(x, y) is outside the i-th candidate region. The symbol $S^L$ represents the local saliency map D11, where $S^L$ (x, y)∈[0, 1] represents the saliency measure of the pixel(x, y).

The symbol $A_i$ is the mean of the saliency measure $S^L$ (x, y) for each pixel in a candidate region (i), and hereafter is referred to as an accuracy score. The larger (i.e., the closer to 1) the accuracy score $A_i$, the higher the possibility (probability) that the candidate region (i) is a saliency region. In one or more embodiments, the mean of the saliency measures is used, however a statistic other than the mean (such as the mode, the maximum, the minimum, and the total) may be used for the accuracy score.

The symbol $C_i$ is a ratio of the total of the saliency measures $S^L$ (x, y) within a candidate region in relation to the total of the saliency measures $S^L$ (x, y) in the entire input image, and hereafter is referred to as the coverage score. The larger (i.e., the closer to 1) the coverage score $C_i$, the higher the possibility (probability) that the candidate region (i) is a saliency region. Note that, since the saliency measure $S^L$ (x, y) may only be given a value of '1' or '0', the denominator of $C_i$ equals the total area of the regions (saliency regions) in the input image where the saliency value is nonzero, and the numerator of $C_i$ equals the area of the section of overlap between the candidate region (i) and the saliency region. Consequently $C_i$ also represents and overlap ratio of the candidate region (i) to the saliency region.

The element β is a weight coefficient used in fine-tuning the balance between the accuracy score $A_i$ and the coverage score $C_i$. In tone or more embodiments of the present invention, β is 0.4.

After calculating the reliability score $conf^L$ for all m candidate regions, the local saliency refinement unit 13 sorts the masks $O_1$ to $O_m$ for each of the candidate regions in order of descending score. The top K candidate region masks (e.g., 20 in one or more embodiments) are then combined to generate a refined local saliency map D13. The masks may be combined by, for instance, mere averaging, or by a weighted sum with a weight corresponding to the reliability score $conf^L$.

Figure 5:
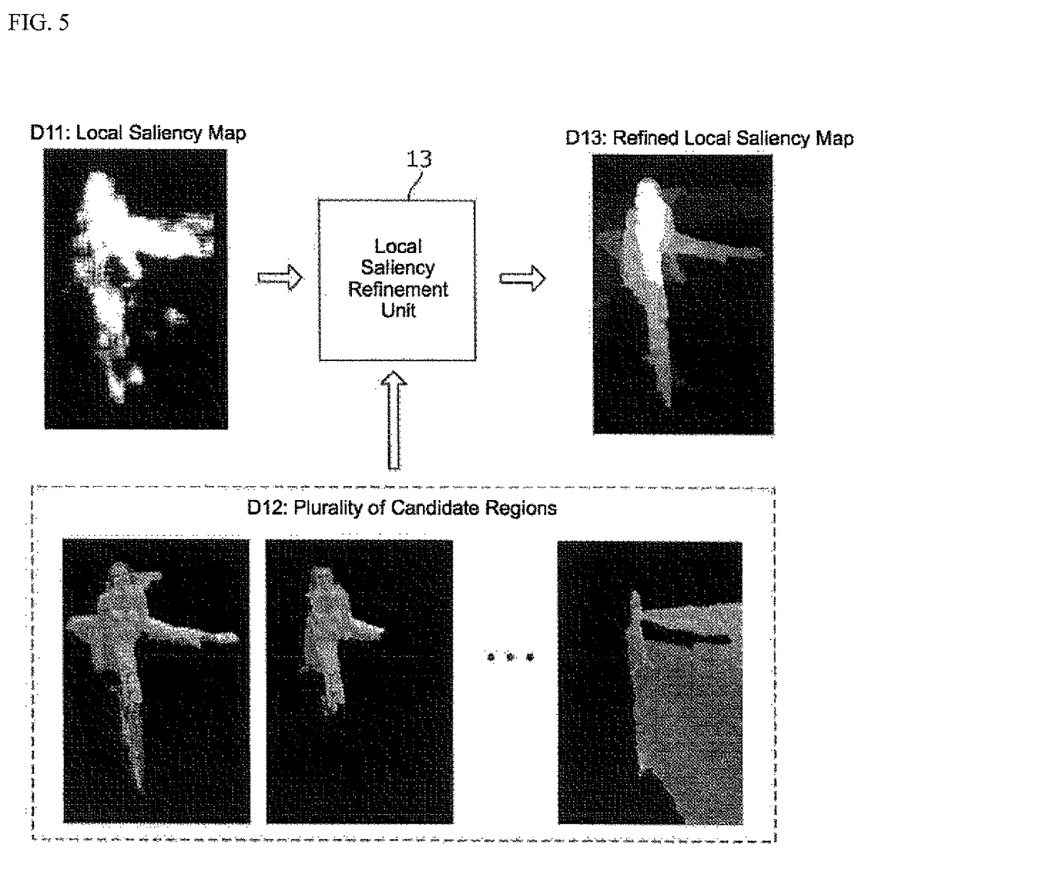
FIG. 5 is a diagram for describing the refining of a local saliency map according to one or more embodiments of the present invention.

FIG. 5 depicts an example of a refined local saliency map D13. It can be understood that supplementing the process of refining the saliency measure with spatial information, such as, being inside or outside the candidate region reduces the noise in a saliency distribution, and increases the spatial uniformity of the saliency distribution.

(2) Global Detection Stage

Figure 6:
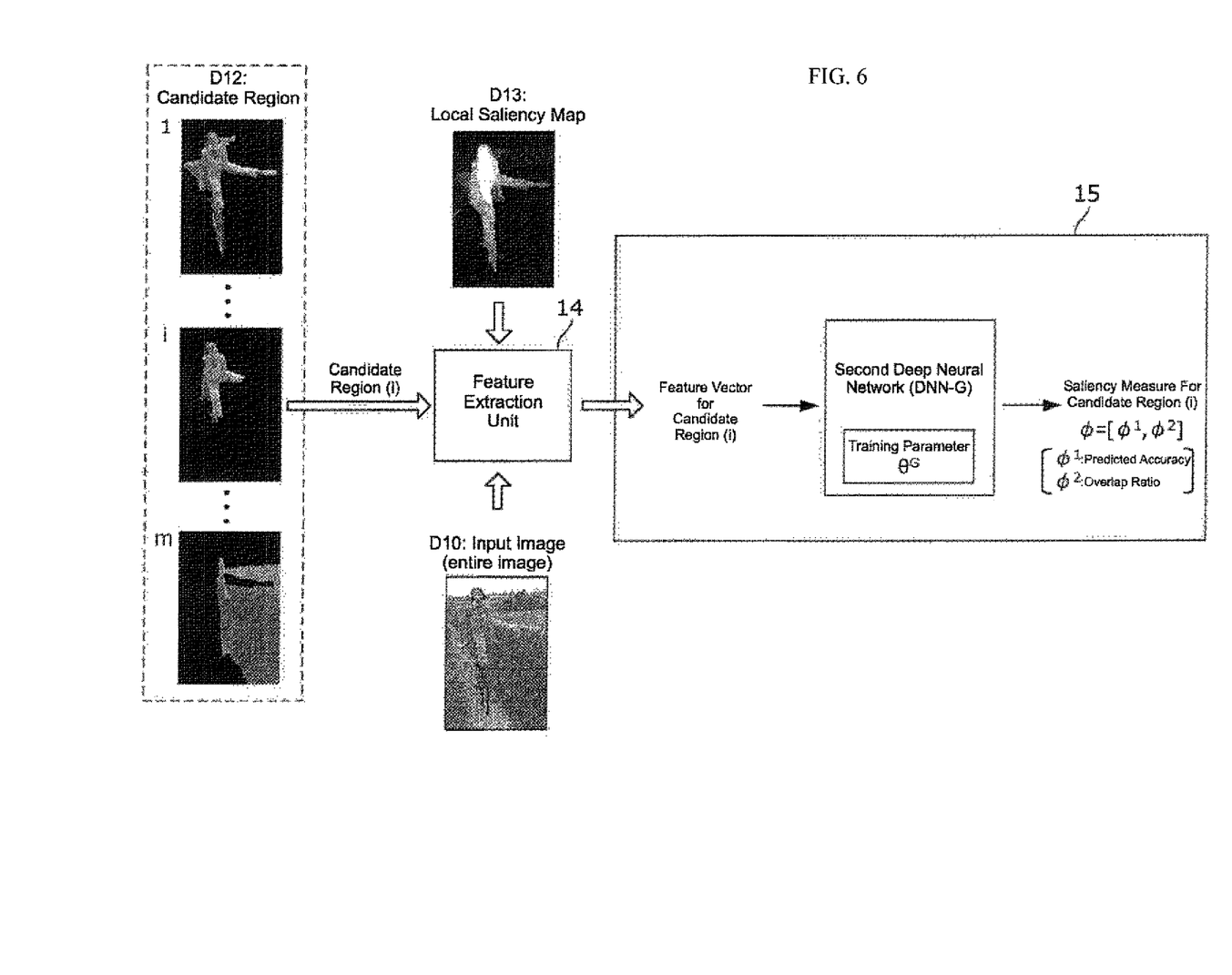
FIG. 6 is a diagram for describing global saliency acquisition according to one or more embodiments of the present invention.

The processes in step S16 through S18 are carried out in order on all the candidate regions D12 set in step S14. FIG. 6 is a schematic of the processes in step S16 through S18.

The feature extraction unit 14 generates a feature vector D14 for a candidate region (i) on the basis of the candidate region (i) being processed, the local saliency map D13, and the input image D10. A feature, which may serve as a clue in determining the saliency of the candidate region (i) may be for instance the following.

(a) Local Saliency Features (a-1) An accuracy score $A_i$ calculated from a mask $O_i$ for the candidate region (i), and the refined local saliency map D13 using Expression (2). This feature represents a statistic of the saliency measure for each pixel in the candidate region (i).

(a-2) A coverage score $C_i$ calculated from a mask $O_i$ for the candidate region (i), and the refined local saliency map D13 using Expression (3). This feature represents a ratio of the total of the saliency measure for each pixel within a candidate region in relation to the total of the saliency measure for each pixel in the entire input image.

(a-3) A product of the accuracy score and the coverage score: $A_i \times C_i$.

(a-4) A ratio of the area of the candidate region (i) to the total area of the saliency regions (regions where the saliency measure is nonzero) within the refined local saliency map D13 (in other words, the overlap ratio).

(b) Global Features (Contrast Features in a Candidate Region)

(b-1) A difference, e.g., a chi-squared distance, between a color histogram of the candidate region (i) and a color histogram of an end region in the input image D10.

Figure 7:
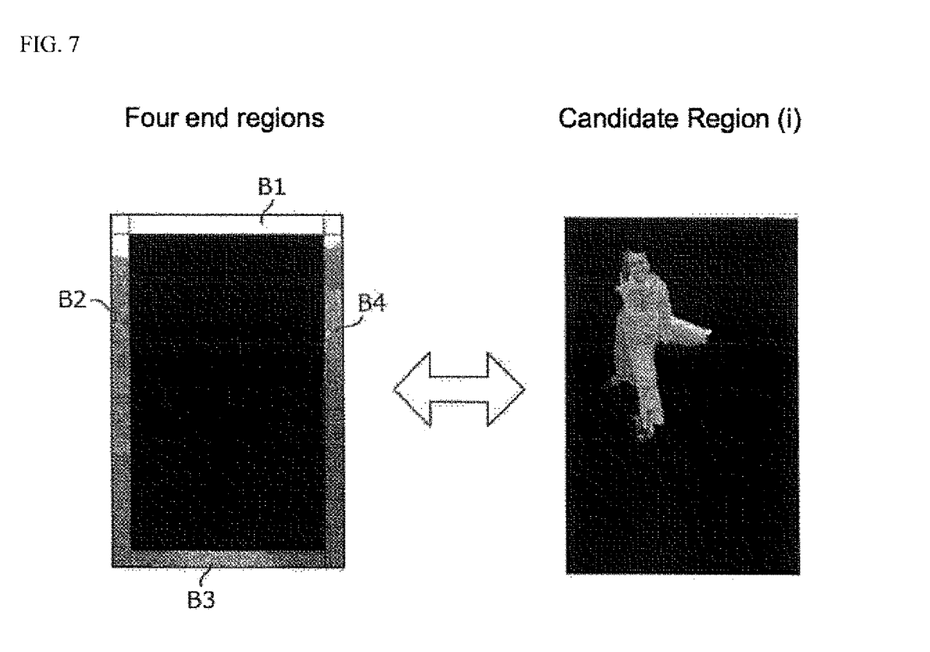
FIG. 7 is a diagram for describing an end region according to one or more embodiments of the present invention.

An end region is a small region located at the ends of the image; for instance, as illustrated in FIG. 7 the end regions B1 through B4 are defined as regions of a predetermined width from the upper end, the left end, the lower end, and the right end respectively of the input image D10. The probability is usually high that the end portion of an image is a background, this feature is considered to represent the contrast of the candidate region (i) in relation to the background. Note that, according to one or more embodiments of the present invention, values other than values calculated in an RGB color space are used, for example, values calculated in other color spaces such as Lab or HSV.

(b-2) A difference, e.g., a Euclidean distance, between a representative color value in the candidate region (i) and a representative color value in an end region in the input image D10. This feature is also considered to represent the contrast of the candidate region (i) in relation to the background. A representative color value may be, for instance, the mean, the mode, the median, the maximum, or the minimum. The feature may be calculated for each color channel (e.g., in the case of RGB, a feature for a representative R-value, a feature for a representative G-value, and a feature for a representative B-value), or the feature may be calculated using a brightness value. Again, according to one or more embodiments of the present invention, values other than values calculated in an RGB color space are used, for example, values calculated in other color spaces such as Lab or HSV.

(b-3) A difference, e.g., a chi-squared distance, between a color histogram of the candidate region (i) and a color histogram of the entire input image D10.

This feature represents the contrast of the candidate region (i) in relation to the entire image. This feature also uses values calculated in a plurality of color spaces such as RGB, Lab, and HSV.

(b-4) The color dispersion within the candidate region (i)

This feature, i.e., the color dispersion may be calculated for each color channel, or may be calculated from brightness values. The values used here may also be calculated in a plurality of color spaces such as RGB, Lab, and HSV.

(c) Global Features (Geometric Features in a Candidate Region)

(c-1) The aspect ratio, height, or with weeds of a square (circumscribing square) encompassing the candidate region (i)

(c-2) A center coordinate for the candidate region (i)

(c-3) The length of the long axis or the length of the short axis for the candidate region (i)

(c-4) An Euler number for the candidate region (i)

In one or more of the above embodiments, all the features provided here are included to create a 72-dimensional feature vector D14; however, any desired type and number of features may be used.

The global saliency acquisition unit 15 uses DNN-G to calculate a saliency measure for a candidate region (i) (step S17). The network DNN-G is configured to receive input of a feature vector D14 for the candidate region, and output a saliency measure for the candidate region as an estimation result. The estimation result φ is given as a prediction accuracy $φ^1$ and an overlap ratio $φ^2$. The prediction accuracy $φ^1$ represents the possibility (probability) that the candidate region (i) is a saliency region, and the overlap ratio $φ^2$ represents a ratio of the area of the candidate region (i) to the total area of the saliency regions within the input image. The global saliency acquisition unit 15 repeats the processes in steps S16 and the S17 until a saliency measure $\phi=[\phi^1, \phi^2]$ is obtained for m candidate regions (step S18). The configuration of DNN-G, and technique for training the parameter $\theta^G$ are described later.

In step S19, the integration unit 16 calculates a reliability score $\mathrm{conf}^G$ for each of candidate region (i) with Expression (4) using the saliency measure $\phi=[\phi^1, \phi^2]$ acquired in step S17. Note that the superscript "G" is a symbol a relationship to global detection.

Formula 2

$$\mathrm{conf}_i^G = \phi_i^1 \times \phi_i^2 \quad \text{Expression (4)}$$

Figure 8:
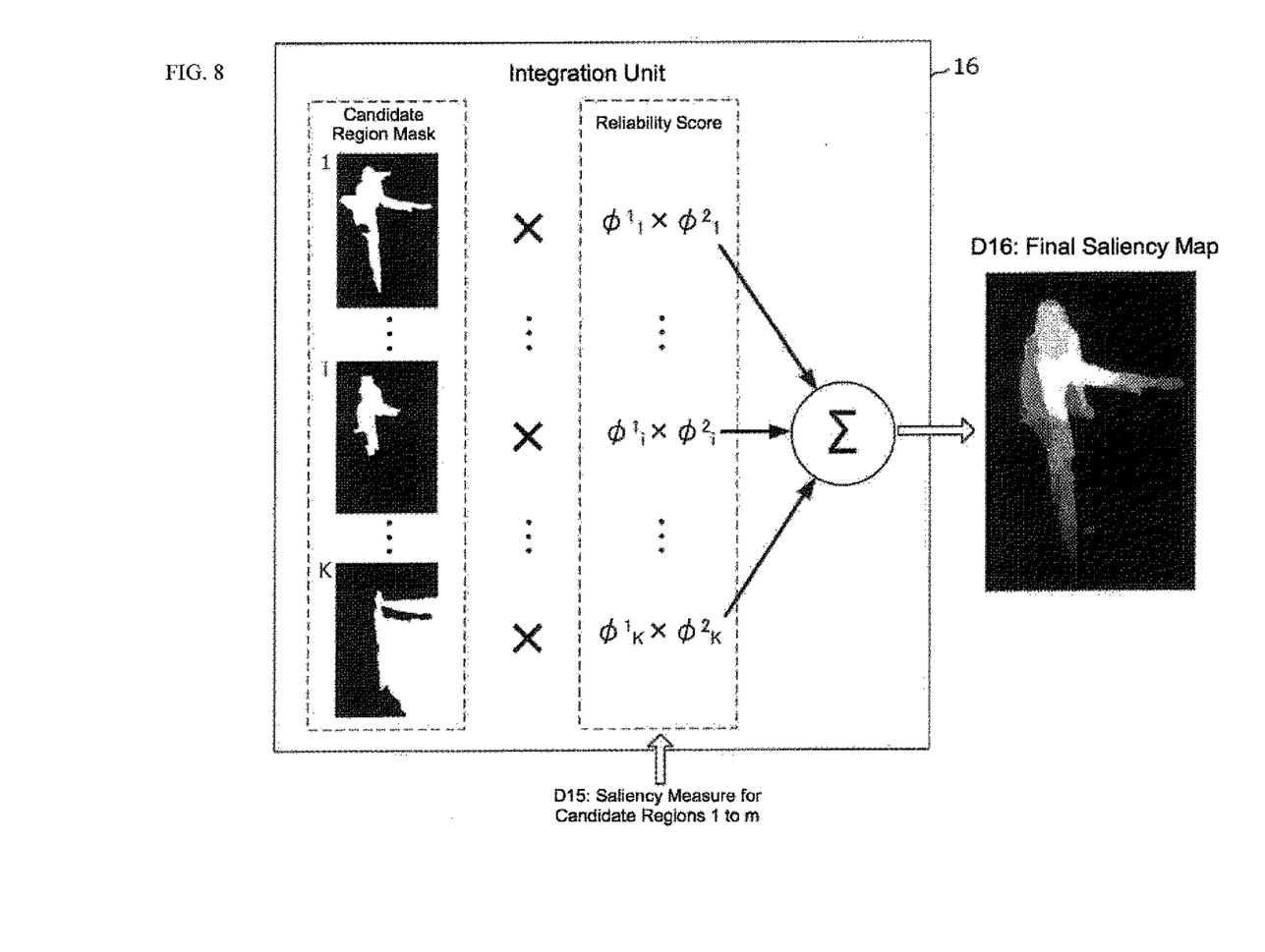
FIG. 8 is a diagram for describing integrating saliency maps according to one or more embodiments of the present invention.

After calculating the reliability score $\mathrm{conf}^G$ for all m candidate regions, the integration unit 16 sorts the masks $O_1$ to $O_m$ for each of the candidate regions in order of descending score. The top K candidate region masks (e.g., 20 in one or more embodiments) are then combined to generate a final saliency map D16. The masks may be combined by, for instance, mere averaging, or by a weighted sum with a weight corresponding to the reliability score $\mathrm{conf}^G$. FIG. 8 illustrates one example of a final saliency map D16 obtained using a weighted sum. It can be understood from FIG. 8 that a highly accurate saliency map can be generated hereby where the saliency measure of the portion in the input image D10 including the subject (the woman) increases.

DNN-L

A configuration example of the DNN-L, which is used in local estimation and the training method therefor is described. Various techniques have been proposed with regards to deep neural networks; although any of these methods may be used, one or more embodiments employs a deep convolutional neural network described in Non-Patent Document 4.

Table 1 illustrates an example configuration of DNN-L.

TABLE 1

| | Layer | | | | | |
|---|---|---|---|---|---|---|
| | 1 | 2 | 3 | 4 | 5 | 6 (Output) |
| Type | C + R + L | C + R | C + R | F + R + D | F + R + D | F + S |
| Channels | 96 | 256 | 384 | 2048 | 2048 | 2 |
| Filter size | 11 × 11 | 5 × 5 | 3 × 3 | — | — | — |
| Pooling size | 3 × 3 | 2 × 2 | 3 × 3 | " | — | — |
| Pooling stride | 2 × 2 | 2 × 2 | 3 × 3 | — | — | W |
| Input size | 51 × 51 | 20 × 20 | 8 × 8 | 2 × 2 | 1 × 1 | 1 × 1 |

The elements "Type" represents the kind of layer. Here, "C" is a convolution layer, And "F" represents a fully connected layer. Additionally, "R" indicates the use of a rectified linear unit (ReLU) as an activation function, "L" indicates the normalization of the filter result, "D" indicates dropout (i.e., that a portion of the neurons will not be allowed to participate in the next calculation to prevent over-filtering), and "S" indicates a softmax layer.

The "Channels" are the number of feature maps (i.e., the dimensionality of the features) output to the next layer. The "Filter size" is the kernel size of the filter used in the convolution computation. The "Pooling size", and the "Pooling stride" are parameters used for down-sampling the feature map. The "Input size" is the size of the feature map entering the layer.

An image containing multiple trainers is used as the training data. Any kind of image may be used. According to one or more embodiments of the present invention, images where various kinds of subjects and scenes are combined are used. A plurality of patches size 51×51 pixels are clips from each of the images; for instance, a center position may be shifted by 10 pixels at a time while clipping tens or hundreds of patches from a single image. The samples are then classified; patches having a large overlap ratio with a ground truth mask (e.g., 0.7 or more) are classified as positive samples, while patches having a small overlap ratio (e.g., 0.3 or less) are classified as negative samples. Positive samples are given the label "1", while negative samples are given the label "0". Finally, hundreds to thousands of patches are prepared under positive samples and negative samples.

Expression (5) represents a training cost function for the DNN-L.

Formula 3

$$L(\theta^L) = -\frac{1}{m}\sum_{i=1}^{m}\sum_{j=0}^{1} 1\{l_i = j\}\log P(l_i = j \mid \theta^L) + \lambda \sum_{k=1}^{6} \|W_k^L\|_F^2 \quad \text{Expression (5)}$$

Here, $\theta^L$ is a training parameter in DNN-L, and contains a weight, a bias, and the like for each of the six layers. The expression $1\{\bullet\}$ is an indicator function. The expression $P(l_i=j|\theta^L)$ is an estimation result from DNN-L, indicating the probability that the i-th training sample is salient ($l_i=1$) or non-salient ($l_i=0$). The parameter $\lambda$ is the weight decay parameter. The parameter $W^L_K$ is the weight of the k-th layer. The expression $\|\bullet\|_F$ is a Frobenius norm. The parameter m is the overall number of training samples.

For instance, the cost function in Expression (5) may be solved using stochastic gradient descent, allowing training of the parameter $\theta_L$ in the DNN-L. The momentum may be set at 0.9, and the weight decay parameter $\lambda$ may be set to 0.0005.

DNN-G

Next, a configuration example of the DNN-G, which is used in global detection, and the training method therefor is described. Table 2 illustrates an example configuration of the DNN-G. The symbols used in the table are identical to the symbols used in Table 1.

TABLE 2

| | Layer | | | | | |
|---|---|---|---|---|---|---|
| | 1 | 2 | 3 | 4 | 5 | 6 (Output) |
| Type | F + R + D | F + R + D | F + R + D | F + R + D | F + R + D | F |
| Channels | 1024 | 2048 | 2048 | 1024 | 1024 | 2 |
| Filter size | — | — | — | — | — | — |
| Pooling size | — | — | — | — | — | — |
| Pooling stride | — | — | — | — | — | — |
| Input size | 1 × 1 | 1 × 1 | 1 × 1 | 1 × 1 | 1 × 1 | 1 × 1 |

Similarly to the DNN-L, an image containing multiple trainers is used as the training data. A plurality of candidate regions (objectness regions) is established in each image using the GOP method. A feature vector V is generated and a label vector y is computed for each of the candidate regions; the label vector y contains an accuracy p comparing the candidate region with a ground truth mask, and an overlap ratio O. The configuration of the feature vector V is identical to the feature vector described in step S16. The accuracy p and the overlap ratio O can be calculated using Expression (2) and Expression (3), respectively, where the saliency map S[sub]L serves as the ground truth mask.

Expression (6) represents a training cost function for the DNN-G.

Formula 4

$$\underset{\theta^G}{\operatorname{argmin}} \frac{1}{m} \sum_{i=1}^{m} \|y_i - \phi(v_i | \theta^G)\|_2^2 + \eta \sum_{k=1}^{6} \|W_k^G\|_F^2 \qquad \text{Expression (6)}$$

Here, $\theta^G$ is a training parameter in DNN-G, and contains a weight, a bias, and the like for each of the six layers. The parameter $y_i = [p_i, O_i]$ is the label vector made up of the accuracy $p_i$ and the overlap ratio $O_i$ for the i-th candidate region. The parameter $v_i$ is the feature vector for the i-th candidate region. The expression $\phi(v_i|\theta^G) = [\phi^1_i, \phi^2_i]$ is the estimation result from DNN-G. The variable $W^G_K$ is the weight of the k-th layer. The expression $\|\cdot\|_F$ is a Frobenius norm. The parameter $\eta$ is the weight decay parameter. The parameter m is the overall number of candidate regions used for training.

For instance, the cost function in Expression (6) may be solved using stochastic gradient descent, allowing training of the parameter $\theta^G$ in the DNN-G. The momentum may be set at 0.9, and the weight decay parameter $\lambda$ may be set to 0.0005.

With one or more of the above described embodiments, a saliency measure (D11 or D13) is calculated per pixel using information obtained from a local region as a clue, whereafter a saliency measure (D15) is calculated for each candidate region with a feature vector (D14) containing the local saliency feature and the global feature for each region as a clue, where local saliency and global saliency are combined to generate final saliency information (D16). Accordingly, saliency can be evaluated in a way that takes into account both localized attributes and attributes embodying the whole image, thereby improving the versatility and the reliability of saliency detection.

Existing saliency detection algorithms require the user to plan the features or combination of features used in evaluating the saliency measure. Therefore, it tended to be extremely difficult to optimize the features used and the performance of the saliency detection algorithm depended disadvantageously on the quality of the features selected. In contrast, using deep learning allows the classifiers DNN-L and DNN-G to be built automatically through machine learning; the classifier DNN-L calculates a saliency measure from information in a local region, and the classifier DNN-G calculates a saliency measure for each candidate region from global information. Consequently, one or more embodiments of the invention may be able to easily build a saliency detector having stable performance.

In addition, the DNN is supplied with as much information as possible, using machine learning to optimize feature extraction, selection, and combination inside the DNN; therefore, this improves the reliability of the estimation result, i.e., the saliency measure.

Finally, a final saliency map (D16) is created from using a weight corresponding to the reliability of the estimation result from the DNN-G for each candidate region (i.e., $\text{conf}^G$) to provide a weighted combination of the saliency measures for a plurality of candidate regions, and thus allows even more reliable saliency information to be obtained.

The above-described embodiments are merely examples, and a scope of the invention is not limited thereto.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE NUMERALS

1 Saliency information acquisition device
10 Image acquisition unit
11 Local saliency acquisition unit
12 Candidate-region setting unit
13 Local saliency refinement unit
14 Feature extraction unit
5 Global saliency acquisition unit
16 Integration unit
D10 Input image
D11 Local saliency map
D12 Candidate region
D13 Refined local saliency map
D14 Feature vector
D15 Estimation result (saliency measure) for candidate region
D16 Final saliency map

The invention claimed is:
1. A saliency information acquisition device comprising:
an image acquisition unit that acquires an input image; and
a processor comprising:
    a local saliency acquisition unit that calculates a saliency measure for each pixel in the input image based on the basis on information obtained from a local region surrounding each pixel,
        wherein the local saliency acquisition unit uses a first deep neural network to calculate a saliency measure for each pixel in the input image;
    a candidate-region setting unit that sets a plurality of candidate regions in the input image;
    a global saliency acquisition unit that calculates a saliency measure for each candidate region in the plurality of candidate regions on the basis of information including a local saliency feature representing an attribute of the saliency measure for each pixel within a candidate region, and a global feature representing an attribute of the candidate regions in relation to the entire input image;
    a local saliency refinement unit configured to refine the saliency measure for each pixel on the basis of the saliency measure for each pixel obtained by the local saliency acquisition unit and the plurality of candidate regions obtained by the candidate-region setting unit so that the saliency measure for a pixel included in the candidate region is increased, and the saliency measure for a pixel outside of the candidate region is decreased, wherein the global saliency acquisition unit uses the saliency measure refined by the local saliency refinement unit to obtain the local saliency feature for each of the candidate regions; and an integration unit that combines the saliency measure for each candidate region in the plurality of candidate regions obtained by the global saliency acquisition unit to generate saliency information for the input image.

2. The saliency information acquisition device according to claim 1, wherein the global saliency acquisition unit uses a second deep neural network to calculate a saliency measure for each candidate region in the plurality of candidate regions.

3. The saliency information acquisition device according to claim 2, wherein the second deep neural network is a neural network configured to receive as input a feature vector containing the local saliency feature and the global feature of a given candidate region as components, and output a saliency measure of said candidate region as an estimation result.

4. The saliency information acquisition device according to claim 3, wherein the integration unit is configured to perform a weighted sum of the saliency measures for the plurality of candidate regions using a weight corresponding to the reliability of the estimation result from the second deep neural network for each candidate region to generate saliency information for the input image.

5. The saliency information acquisition device according to claim 1, wherein the first deep neural network is a neural network configured to receive an image of a local region surrounding a given pixel as an input, and output a saliency measure for said pixel as an estimation result.

6. The saliency information acquisition device according to claim 5, wherein the global saliency acquisition unit uses a second deep neural network to calculate a saliency measure for each candidate region in the plurality of candidate regions.

7. The saliency information acquisition device according to claim 1, wherein the candidate-region setting unit detects a plurality of objectness regions from within the input image, and sets the plurality of detected regions as the plurality of candidate regions.

8. The saliency information acquisition device according to claim 7, wherein the candidate-region setting unit uses the Geodesic Object Proposal technique to detect the objectness regions from within the input image.

9. The saliency information acquisition device according to claim 1, wherein the global saliency acquisition unit uses a second deep neural network to calculate a saliency measure for each candidate region in the plurality of candidate regions.

10. The saliency information acquisition device according to claim 1, wherein the global saliency acquisition unit uses a second deep neural network to calculate a saliency measure for each candidate region in the plurality of candidate regions.

11. The saliency information acquisition device according to claim 1, wherein the local saliency feature includes one of:

a statistic of the saliency measure for each pixel within the candidate region;

a ratio of the total of the saliency measure for each pixel in a candidate region to the total of the saliency measure for each pixel in the entire input image;

a product of the statistic and the ratio; and an overlap ratio of the aforementioned candidate region to the regions in the input image where the saliency measure is nonzero.

12. The saliency information acquisition device according to claim 1, wherein the global feature includes one of:

a difference between a color histogram for the candidate region and the color histogram of an end region in the input image;

a difference between a representative color value within the candidate region and a representative color value within the end region in the input image;

a difference between a color histogram of the candidate region and a color histogram of the entire input image; and the dispersion of the colors within the candidate region.

13. The saliency information acquisition device according to claim 1, wherein a global feature includes one of:

the aspect ratio of a square enclosing the candidate region;

the height of said square;

the width of said square;

the center coordinate of the candidate region;

the length along the long axis of the candidate region;

the length along the short axis of the candidate region; and an Euler number for the candidate region.

14. A saliency information acquisition method having steps comprising:

a first step of calculating, using a first deep neural network, a saliency measure for each pixel in an input image on the basis of information obtained from a local region surrounding each pixel;

setting a plurality of candidate regions in the input image;

a second step of calculating a saliency measure for each candidate region in the plurality of candidate regions on the basis of information including a local saliency feature representing an attribute of the saliency measure for each pixel within a candidate region, and a global feature representing an attribute of the candidate regions in relation to the entire input image; and refining the saliency measure for each pixel on the basis of the saliency measure for each pixel calculated in the first calculating step and the plurality of candidate regions set in the setting step so that the saliency measure for a pixel included in the candidate region is increased, and the saliency measure for a pixel outside of the candidate region is decreased, wherein the second calculating step uses the saliency measure refined in the refining step to obtain the local saliency feature for each of the candidate regions; and combining the saliency measure for each candidate region in the plurality of candidate regions to generate saliency information for the input image.

* * * * *